United States Patent

[11] 3,627,830

| [72] | Inventors | Horst Kerber<br>Lake Jackson, Tex.;<br>Heinz Hohenschutz, Mannheim; Konrad<br>Rauch, Limburgerhof, both of Germany |
|---|---|---|
| [21] | Appl. No. | 796,186 |
| [22] | Filed | Feb. 3, 1969 |
| [45] | Patented | Dec. 14, 1971 |
| [73] | Assignee | Badische Anilin & Soda-Fabrik<br>Aktiengesellschaft<br>Ludwigshafen am Rhine, Germany |

[54] PRODUCTION OF PURE-N-DIMETHYLACYLAMIDES
7 Claims, No Drawings

[52] U.S. Cl. .................................................. 260/561 R
[51] Int. Cl. .................................................. C07c 103/00
[50] Field of Search .......................................... 260/561 R

[56] References Cited
UNITED STATES PATENTS
3,072,725  1/1963  Surman .................... 260/561
3,300,531  1/1967  James, Jr. et al .......... 260/561
3,342,862  9/1967  Board, Jr. et al .......... 260/561

Primary Examiner—Lewis Gotts
Assistant Examiner—Ethel G. Love
Attorney—Johnston, Root, O'Keeffe, Keil, Thompson & Shurtleff

ABSTRACT: Production of pure N-dimethylacylamides having from two to four carbon atoms in the acyl radical by reaction of an excess of dimethylamine with an aliphatic carboxylic acid having two to four carbon atoms at elevated temperature and distillation of the N-dimethylacylamide formed, the distillation being carried out continuously in a column. Dimethylamine and the carboxylic acid in the molar ratio from 1.1:1 to 5:1 are introduced at from 80° to 220°C. and from 0.1 to 2 atmospheres in the absence of any catalyst into a mixture of N-dimethylacylamide and its carboxylic acid, the carboxylic acid content of the mixture corresponding at least to the amount of carboxylic acid present in the azeotropic mixture of the N-dimethylacylamide and its carboxylic acid. N-dimethylacylamides are used as solvents for polymers.

PRODUCTION OF PURE-N-DIMETHYLACYLAMIDES

The present invention relates to an improved process for the production of N-dimethylacylamides by reaction of dimethylamine with aliphatic carboxylic acids.

It is known from U.S. Pat. Specification No. 2,667,511 that N-dimethylacylamides can be prepared by reaction of dimethylamine with aliphatic carboxylic acids having from two to four carbon atoms.

It is necessary in the process however to introduce the starting materials at the reaction temperature into a mixture of the appropriate dimethylacylamide and its carboxylic acid so that the carboxylic acid content in the mixture being less than the carboxylic acid content of the azeotropic mixture of the N-dimethylacylamide and its carboxylic acid. It is necessary first to prepare the mixture to be placed in the vessel in an additional operation by mixing the di-methylacylamide and carboxylic acid, because the production of such a mixture by the direct method by reaction of dimethylamide and carboxylic acid in the reaction vessel is not possible (cf. J. Am. Chem. Soc., 59, 401–402 (1937)). In order to obtain a fairly pure product, the process also requires high expenditure for apparatus.

U.S. Pat. Specification No. 3,006,956 describes the production of dimethylacylamides by reaction of an excess of dimethylamine with a lower aliphatic carboxylic acid at elevated temperature and a pressure of more than 63 atmospheres. Only an incomplete conversion is achieved however by this method. Moreover the process requires the use of autoclaves or other pressure apparatus.

There has therefore been a need for a process by which higher conversions are achieved and the end products can be prepared in a simpler manner and in greater purity than by prior art methods.

It is an object of the present invention to provide an improved method of producing N-dimethylacylamides in which practically complete conversion of the starting materials is achieved. Another object of the invention is to provide a process in which the end products are obtained in high purity.

In accordance with the present invention these and other objects and advantages are achieved by an improved method for the production of pure N-dimethylacylamides having from two to four carbon atoms in the acyl radical by reaction of an excess of dimethylamine with an aliphatic carboxylic acid having two to four carbon atoms at elevated temperature and distillation of the N-dimethylacylamide formed, the reaction and distillation being carried out continuously in a column, wherein the improvement consists in introducing dimethylamine and the carboxylic acid in the molar ratio from 1.1:1 to 5:1 at a temperature of from 80° to 220° C. and at a pressure of from 0.1 to 2 atmospheres in the absence of any catalyst into a mixture of N-dimethylacylamide and its carboxylic acid, the carboxylic acid content of the mixture corresponding at least to the amount of carboxylic acid present in the azeotropic mixture of the N-dimethylacylamide and its carboxylic acid.

The end products are obtained in high purity at practically complete conversion according to the new process.

The starting materials are introduced into the column at a point where the carboxylic acid content in the liquid phase of dimethylacylamide and carboxylic acid present is at least equal to that of the azeotropic mixture of N-dimethylacylamide and carboxylic acid. The mixture may additionally contain the N-monomethylacylamide of the carboxylic acid. This is generally the case when using commercial dimethylamine containing monomethylamine.

It is surprising that higher conversions are obtained by the new process than by the method according to U.S. Pat. Specification No. 2,667,511 because in the said Pat. Specification there is a recommendation that the starting materials should be introduced into a mixture of dimethylacylamide and carboxylic acid in which the carboxylic acid content is less than that of the azeotropic mixture in order to obtain satisfactory conversions.

Acetic acid, propionic acid and the butyric acids, but particularly acetic acid, may be used as aliphatic carboxylic acids for the process according to the invention.

The new process is carried out continuously using a column so that the end product may be prepared in a simple manner on an industrial scale. Columns of any design, for example bubble cap tray columns, valve plate column or packed columns, are suitable for the process. It is advantageously to use columns having from 25 to 80, particularly from 40 to 60, theoretical trays.

Generally the starting materials are introduced into the lower third of the column, particularly between the first and eighth theoretical trays. Dimethylamine and carboxylic acid are used in a molar ratio of from 1.1:1 to 5:1, preferably from 1.5:1 to 2:1. At the beginning of the reaction, a mixture of dimethylacylamide and its carboxylic acid in which the carboxylic acid content is at least the amount of the carboxylic acid in the azeotropic mixture of the N-dimethylacylamide and its carboxylic acid, is present in the column. The mixture is advantageously prepared in the column itself by reaction of dimethylamine with the carboxylic acid, for example by allowing the carboxylic acid to distill in the column and passing in dimethylamine. The carboxylic acid content of the mixture of dimethylacylamide and carboxylic acid thus obtained in the column is at least equal to that of the azeotropic mixture of the dimethylamide and the carboxylic acid. The starting materials are advantageously supplied to the mixture in the column at such a rate and at such a reaction temperature that the volume of liquid in the evaporator and column is kept substantially constant.

Dimethylamine and the carboxylic acid may be supplied for the reaction at different places, the amine being advantageously supplied at a point lower than the point of supply of the carboxylic acid. The starting materials are however generally added as a mixture.

Excess dimethylamine, recovered in gaseous phase, is advantageously returned to the reaction. Dimethylamine dissolved in the water of reaction may also be recovered for example by heating and reused for the reaction. Since the reaction is practically quantitative, almost stoichiometric amounts of carboxylic acid and dimethylamine are supplied in steady-state operation.

Temperatures of from 80° to 220° C., preferably from 160° to 210° C., are used for the reaction. The process according to this invention is carried out at pressures of from 75 mm. to 2 atmospheres, preferably from 0.5 to 1.5 atmospheres. Atmospheric pressure is particularly suitable.

The dimethylacylamides formed are separated in the column by fractionation from water of reaction, excess dimethylamine and impurities. The dimethylacylamide is advantageously withdrawn at a tray lying in the middle region or in the upper third of the column. Generally the dimethylacylamide is withdrawn at a tray lying 17 to 34, preferably 22 to 31, theoretical trays above the tray at which the carboxylic acid is supplied.

The end product generally contains less than 0.01 percent by weight of carboxylic acid and less than 0.7 percent by weight of water. Water still present in the dimethylacylamide can be removed in a simple way for example by treatment with siccatives such as molecular sieves, or by vapor distillation.

When the reaction product contains dimethylformamide as an impurity, this is preferably withdrawn by means of a bleed stream above the point of withdrawal of the end product. In the recovery of dimethylacetamide, the dimethylformamide is generally withdrawn at a tray whose temperature is from 110° to 150° C. at atmospheric pressure. The water contained in the starting materials and formed in the reaction is preferably withdrawn at the top. The reflux ratio at the top of the column depends on the number of trays between the top of the column and the tray at which the dimethylformamide is withdrawn. At a low-reflux ratio, a larger number of trays is required for the separation of water and carboxylic acid, and at a high-reflux ratio, a correspondingly lower number of trays is required.

When the number of trays is for example 11 theoretical trays, it is advantageous in the case of acetic acid to use a reflux ratio of from 1:2 to 15:1. Reflux ratio is the ratio by weight of reflux to the aqueous phase withdrawn.

Commercial dimethylamine generally contains small amounts of monomethylamine. When starting material containing monomethylamine is used, monomethylacylamide formed as an impurity accumulates in the evaporator from which it has to be withdrawn, preferably continuously. It is advantageous to allow the concentration of monomethylacylamide in the liquid present in the evaporator to rise to about 80 to 90 percent by weight before withdrawal is commenced. By this method, the monomethylacylamide can be separated very selectively and therefore very economically.

Dimethylacylamides are important solvents, for example for polymerized substances.

The invention is illustrated by the following Example.

EXAMPLE

The column used is a bubble tray column having 100 trays having a tray efficiency of 0.55. Acetic acid and dimethylamine are introduced in the molar ratio of 1:1.7. at the fourth tray in the column, counting from the bottom. Water and dimethylamine are withdrawn at the top of the column at a reflux ratio of 10. The dimethylamine escaping as a gas is reintroduced at the fourth tray. Impurities are withdrawn at the 80th tray and from the still. The still temperature is 201° C. and the temperature at the top is 98° C.

The following Table shows the amount and composition of the starting materials and the products withdrawn:

Starting materials:

| Tray No. | g./hour | Composition in % by weight | |
|---|---|---|---|
| 4 | 1200 | acetic acid | 99.75 |
|   |   | formic acid | 0.15 |
|   |   | water | 0.10 |
| 4 | 1700 | dimethylamine | 99.2 |
|   |   | monomethylamine | 0.5 |
|   |   | methanol | 0.2 |
|   |   | trimethylamine | 0.1 |
|   | 2900 | | |

Products withdrawn:

| Tray No. | g./hour | Composition in % by weight | |
|---|---|---|---|
| 52 | 1685 | dimethylacetamide | 99.48 |
|   |   | water | 0.52 |
| 80 | 80 | dimethylacetamide | 70.46 |
|   |   | dimethylformamide | 3.04 |
|   |   | water | 26.50 |
| top | 420 | water | 82.6 |
|   |   | dimethylamine | 17.4 |
|   |   | dimethylamine (gaseous) | |
| bottoms | 15 | monomethylacetamide | 81.55 |
|   |   | dimethylacetamide | 9.59 |
|   |   | acetic acid | 8.86 |
|   | 2900 | | |

The product at the eighth tray (four trays above the point of feed of the starting materials) has the following composition:
51.04 percent by weight of dimethylacetamide
7.77 percent by weight of monomethylacetamide
41.19 percent by weight of acetic acid With reference to dimethylacetamide and acetic acid only, there is a content of 55.3 percent by weight of dimethylacetamide and 44.7 percent by weight of acetic acid.

The composition of the product four trays below the feed point is 9.59 percent by weight of dimethylacetamide, 81.55 percent by weight of monomethylacetamide and 8.86 percent by weight of acetic acid. Referred to dimethylacetamide and acetic acid only, this corresponds to a content of 52 percent by weight of dimethylacetamide and 48 percent by weight of acetic acid. The yield of dimethylacetamide (with reference to acetic acid) is 97.3 percent of the theory. By vapor distillation (in which only water is withdrawn at the top of the column and the bottoms temperature is 166° C.) the water content of the dimethylacetamide can be lowered to less than 0.001 percent by weight.

We claim:

1. An improved process for the production of pure N-dimethylacylamides having from two to four carbon atoms in the acyl radical by reaction of an excess of dimethylamine with an aliphatic carboxylic acid having two to four carbon atoms at elevated temperature and distillation of the N-dimethylacylamides formed, reaction and distillation being carried out continuously in a column, wherein the improvement consists in introducing dimethylamine and the carboxylic acid in the molar ratio from 1.1:1 to 5:1 at a temperature of from 80° to 220° C. and at a pressure of from 0.1 to 2 atmospheres in the absence of any catalyst into a mixture of N-dimethylacylamide and its carboxylic acid, the carboxylic acid content of the mixture corresponding at least to the amount of carboxylic acid present in the azeotropic mixture of the N-dimethylacylamide and its carboxylic acid.

2. A process as claimed in claim 1 wherein dimethylamine and the carboxylic acid are used in a molar ratio of from 1.5:1 to 2:1.

3. A process as claimed in claim 1 wherein the reaction is carried out at a temperature of from 160° to 210° C.

4. A process as claimed in claim 1 wherein the reaction is carried out at atmospheric pressure.

5. A process as claimed in claim 1 wherein a column having from 25 to 80 theoretical trays is used.

6. A process as claimed in claim 1 wherein the starting materials are introduced in the lower third of the column.

7. A process as claimed in claim 1 wherein the N-dimethylacylamide is withdrawn at a point which is from 17 to 34 theoretical trays above the tray at which the carboxylic acid is fed in.

* * * * *